United States Patent [19]
Shelley

[11] 3,743,235
[45] July 3, 1973

[54] APPARATUS FOR FABRICATING UNITS OF MOLDABLE BUILDING MATERIAL

[76] Inventor: Shelley W. Shelley, 55-B Pine Grove, Condominium, Isla Verde, P.R. 00914

[22] Filed: Dec. 24, 1970

[21] Appl. No.: 101,306

[52] U.S. Cl.................. 249/121, 249/120, 249/161
[51] Int. Cl............................................ B28b 7/08
[58] Field of Search ............... 25/41 R, 1 B, 121 R; 249/118, 120, 125, 126, 129, 131, 137, 139, 160-164, 168-170, 121; 164/129, 136, 350

[56] References Cited
UNITED STATES PATENTS

| | | | |
|---|---|---|---|
| 1,773,454 | 8/1930 | Fowler | 25/1 B |
| 3,058,164 | 11/1962 | Rowe | 249/126 X |
| 3,129,481 | 4/1964 | Sullivan | 25/1 B |
| 2,583,626 | 1/1952 | Buell | 249/137 X |
| 3,511,467 | 5/1970 | Rohrer | 249/118 |
| 3,360,231 | 12/1967 | Hezik | 249/169 X |
| 3,220,692 | 11/1965 | Eklund | 249/161 |
| 3,488,817 | 1/1970 | Katz | 249/160 X |
| 3,519,243 | 7/1970 | Kleiber | 249/168 X |
| 1,760,282 | 5/1930 | Pederson | 249/129 X |

FOREIGN PATENTS OR APPLICATIONS

150,046   6/1962   U.S.S.R. .............................. 25/41 R

Primary Examiner—J. Spencer Overholser
Assistant Examiner—B. D. Tobor
Attorney—Lawrence W. Flynn

[57] ABSTRACT

Precast units of a moldable building material, such as concrete, are prepared by pouring the material into molds of the desired geometric configuration which are disposed at an angle greater than zero degrees but less than 90° from the horizontal. The precast units may be reinforced and insulated. Pouring of the building material into molds disposed at an angle between the horizontal and vertical position results in finished precast units of building material which are of substantially uniform composition and properties and which do not require hand or machine surface finishing. The molds are typically disposed at an angle of 20° to 70° above the horizontal and preferably at an angle of 30° to 60° above the horizontal. This angle is measured between the horizontal and a suitable dimension of the mold, such as, for example, the axis of a cylindrical mold or the plane of a panel mold.

4 Claims, 9 Drawing Figures

Patented July 3, 1973

INVENTOR.
SHELLEY W. SHELLEY

SHELLEY W. SHELLEY

Patented July 3, 1973   3,743,235

SHELLEY W. SHELLEY

APPARATUS FOR FABRICATING UNITS OF MOLDABLE BUILDING MATERIAL

BACKGROUND OF THE INVENTION

This invention relates to apparatus and methods for fabricating precast units of a moldable building material. More particularly, it relates to the fabrication of such units by pouring the moldable building material into molds which are disposed at an angle greater than zero degrees but less than 90 degrees above the horizontal. The apparatus and method of this invention are applicable to any conventional pourable, moldable building material. One such commonly used material is concrete and, for purposes of clarity, much of the invention will be described with specific reference to concrete. Moreover, the invention is in no way limited to the geometric shape of the precast units prepared although again, for purposes of clarity, much of the invention will be described in terms of precast panels or slabs.

The use of precast units of a moldable building material has gained widespread acceptance in recent years as a means for quickly and inexpensively assembling housing units. Concrete panels, in particular, have found widespread acceptance in this area. These panels are now ordinarily prepared using either horizontally or vertically disposed molds. When the panels are poured using a horizontal mold, an open mold is used into which the concrete is poured. One surface of the panel does not contact a smooth mold surface and, as a result, develops a rough texture which ordinarily must be removed by either hand or machine finishing. Such a finishing operation is expensive, time consuming and highly undesirable. Moreover, if the panel is to be of a sandwich type construction, e. g., a layer of insulating material disposed between two outer layers of concrete, horizontal pouring of the building material is the only way such panels can now be prepared. A first concrete layer is poured into the open horizontal mold after which the layer of insulating material is emplaced on top of the first layer of concrete. The second layer of concrete is then poured on top of the layer of insulating material. The outer surface of the second concrete layer will still require a hand or machine finishing operation.

When the panels are prepared by pouring concrete into a vertically disposed mold, one of the major problems encountered is the segregation of the concrete aggregate which occurs in the mold. The heavier particles in the aggregate tend to segregate in the lower portions of the mold while the lighter particles segregate in the upper portions of the mold. The result is that the finished panel is of non-uniform composition and non-uniform properties. For example, the strength of the panel can vary substantially depending upon location within the panel. Another disadvantage of vertically disposed molds is that they cannot be used to prepare a precast unit of sandwich construction, as described hereinabove. It also becomes quite difficult to maintain concrete reinforcement rods or mesh at the location where they were originally emplaced when vertical molds are employed. There is a strong tendency for these reinforcements rods or mesh to be displaced, as the concrete is poured into the mold, to a less favorable position within the panel, often producing an adverse effect upon the strength of the panel. Although this problem can be minimized by providing means within the mold to retain the reinforcement rods or mesh in position, this is an expensive and time consuming operation and is not entirely satisfactory. A further disadvantage of the use of vertical molds is that they are difficult to open for the purpose of removing the concrete panel from the mold.

It can thus be seen that while horizontal and vertical molds each have their unique advantages, each type of mold is also hampered by serious disadvantages. It is an object of this invention, therefore, to provide apparatus and methods which simultaneously take advantage of the best features of the horizontal and vertical mold while eliminating the drawbacks individually associated with a horizontal or vertical mold.

It is another object of this invention to provide apparatus and methods for preparing precast units of moldable building material which do not require hand or machine surface finishing.

It is another object of this invention to provide apparatus and methods for preparing precast units of moldable building material which are of substantially uniform composition throughout and which exhibit substantially uniform properties.

It is another object of this invention to provide apparatus and methods whereby the precast units of moldable building material can be easily removed from their molds with minimal danger of damage to the unit.

It is a still further object of this invention to provide apparatus and methods which make use of all the advantages of vertical molds but which eliminate the disadvantage of the shifting of the reinforcement means within the mold during pouring of the building material.

These and other objects of this invention will be apparent to one skilled in the art from a consideration of this entire disclosure.

SUMMARY OF THE INVENTION

In accordance with this invention, the above objectives are achieved by providing an apparatus which comprises one or more mold assemblies mounted on a rigid frame in such manner that the mold assemblies can be disposed at an angle greater than 0° but less than 90° above the horizontal. The moldable building material is then poured into the cavity of the mold assembly while the assembly is disposed at the forementioned angle.

In one embodiment of such an apparatus, a mold assembly is provided which comprises a first and a second mold member, at least one of which contains a chamber. These two members cooperate in the mold assembly to define a molding cavity of the desired geometric configuration. For example, if a panel mold is desired, the first mold member will contain a chamber having the configuration of a panel while the second mold member is a lid member which covers the chamber and defines one surface of the mold. If the mold is of a cylindrical configuration, both mold members will contain a channel of a half cylinder configuration.

The first mold member is pivotally mounted to a vertical frame while the second mold member is rigidly mounted to the same frame but above the pivotal mounting of the first mold member. The second member is rigidly disposed at an angle which is greater than 0° but less than 90° above the horizontal. Means are provided for pivoting the first mold member about its pivotal mounting on the frame between its horizontal position and an angle substantially identical to that at which the second mold member is disposed. There is provided, in effect, a first movable mold member and a second stationary mold member. The movable mold member can be disposed in either the horizontal position or an inclined position between the horizontal and the vertical. The advantage of this arrangement is that in certain types of construction, the precast unit can be partially formed while this second member is disposed in the horizontal position in order to make use of the advantages of a horizontal mold whereupon the remainder of the unit can be completed once the second mold member, containing the partially formed unit, is raised to the inclined position in order to make use of the advantages of the inclined position. The usage of this apparatus will be presented in greater detail hereinbelow.

In another embodiment of the apparatus of this invention, one or more mold assemblies comprising a first and second mold member as defined hereinabove, are rotatably and slidably mounted on a frame. Also mounted to the frame is a rigid fulcrum member in close proximity to the mold assembly. Means are provided to pivot the mold assembly about the fulcrum member to any desired angle greater than 0° but less than 90° above the horizontal. When the moldable building material is to be poured into the mold, the mold assembly is disposed at the desired inclined angle. Once the precast unit has been formed within the mold, the force which restrains the mold assembly at the inclined angle during pouring is released allowing the mold assembly to rotate into a substantially upright position to facilitate removal of the unit from the mold. As this rotation occurs, the bond between one surface of the cast unit and its adjoining mold surface is cleanly broken helping to facilitate removal of the unit from the mold. Ths units can then be removed by pulling them out vertically from the mold or the mold assembly can be horizontally disassembled by slidably separating the two members comprising the mold assembly to expose the precast unit of building material contained therein.

In accordance with the method of this invention, precast units of moldable building material are fabricated by pouring the material into a mold of the desired geometric configuration while thy mold is inclined at an angle which is greater than 0° but less than 90° above the horizontal. This method is particularly suitable for preparing precast units which are comprised of only building material and reinforcement means. These reinforcement means are inserted into the mold prior to the pouring of the building material and can be retained at the proper position within the mold by the force of gravity resulting from the angle at which the mold is disposed or by the use of conventional anchoring devices such as, for example, chairs.

If a precast unit of a sandwich construction is to be fabricated, a sufficient amount of moldable building material to form a first layer of the material is poured into an open mold cavity of suitable geometric configuration while the mold is in a substantially horizontal position. While the material is still moist, a layer of insulating material or any other material which is to be sandwiched between two layers of building material is emplaced against the surface of the first layer of building material. The mold is then closed and raised to an inclined angle between the vertical and the horizontal at which point additional building material is poured into the mold between the lid and the surface of the layer of insulating material to form a second layer of concrete in the mold. When this technique is used, reinforcement means may be provided in either concrete layer by inserting said means into the mold in the appropriate position prior to pouring of the building material.

The invention will become more fully apparent from the following description of certain preferred embodiments, when read with reference to the accompanying drawings.

DESCRIPTION OF CERTAIN PREFERRED EMBODIMENTS

Figures 1, 1A:
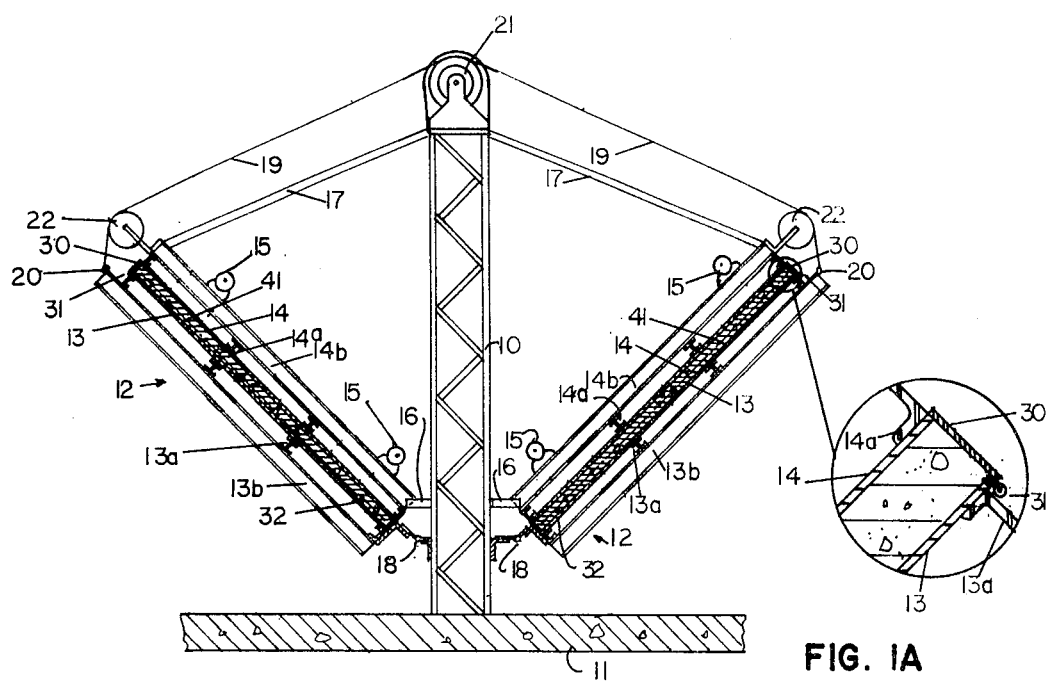
FIG. 1 is a schematic side view, partly in section, showing one preferred embodiment of an apparatus of this invention. The apparatus is shown with both members of the mold assembly in the inclined position.
FIG. 1A is an enlarged isolated view of the circled portion of the apparatus of FIG. 1.
Figure 2:
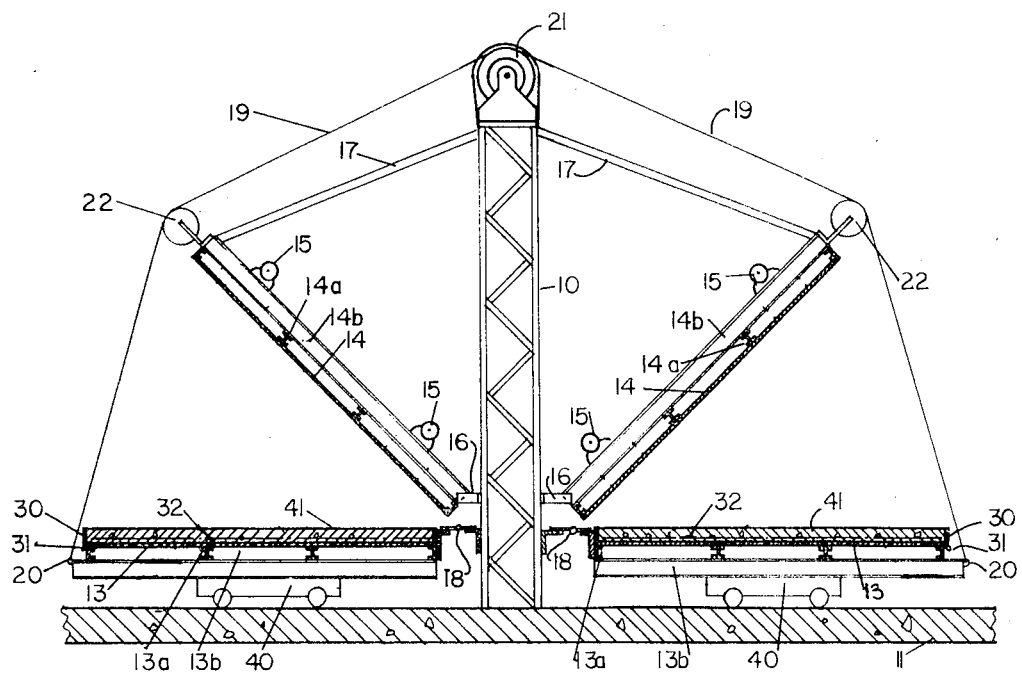
FIG. 2 is a view of the apparatus of FIG. 1 except that the mold assembly is shown in the open position with one of the members comprising the mold assembly disposed in the horizontal position. The horizontally disposed member rests atop a trolley for convenient removal of this member from the apparatus.
Figure 3:
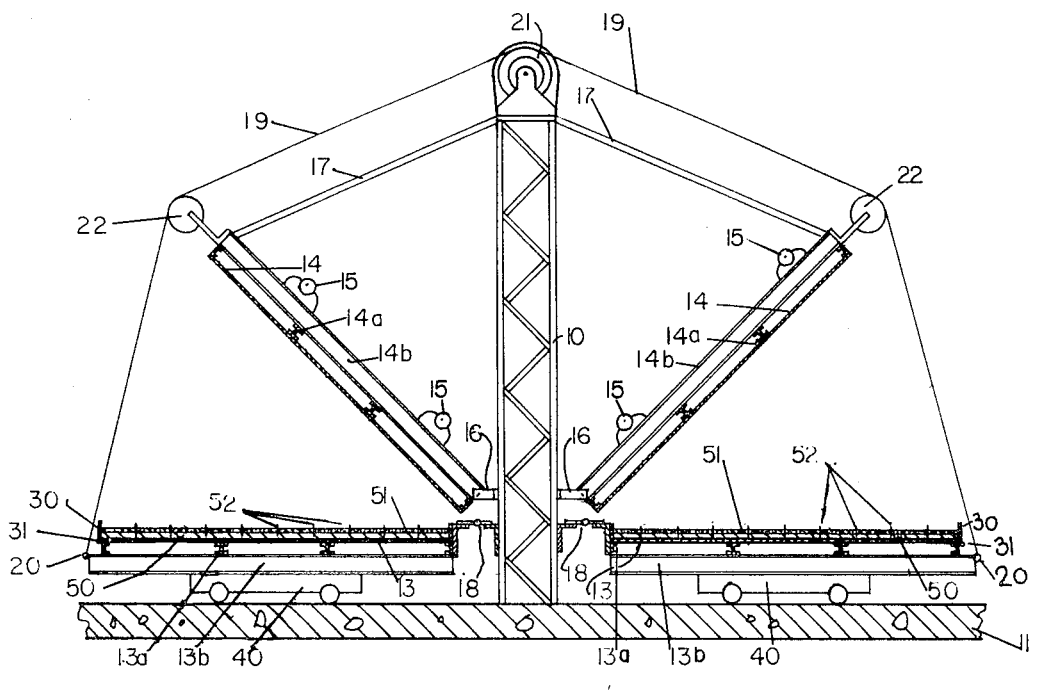
FIG. 3 is substantially identical to FIG. 2 except that it illustrates the use of the apparatus in the formation of a precast unit of moldable building material having a sandwich configuration. In such a fabrication, a portion of the unit is poured while one member of the mold assembly is in a horizontal position, as shown in FIG. 3.
Figure 4:
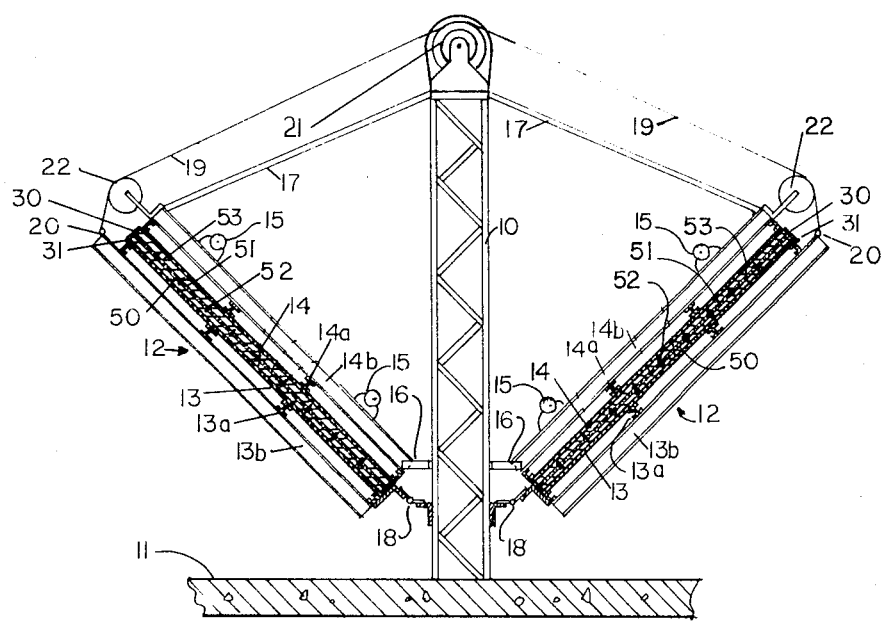
FIG. 4 is a view of the apparatus of FIG. 3 showing both members of the mold assembly in an inclined position at which the fabrication of the precast sandwich unit began in FIG. 3 is completed.

One preferred embodiment of the apparatus of this invention is shown in FIGS. 1 through 4. FIGS. 1 and 2 illustrate the use of this apparatus to fabricate a reinforced concrete panel. FIGS. 3 and 4 illustrate the use of this apparatus to prepare a reinforced and insulated concrete panel of a sandwich type configuration. Since the structure of the apparatus is essentially similar in FIGS. 1 through 4, common identifying numerals will be employed for common parts appearing in all of these figures.

Referring to FIGS. 1 through 4, it is seen that the apparatus comprises a vertical frame 10 mounted to a solid support base 11, with two mold assemblies 12 of a panel configuration mounted onto frame 10 near its bottom. Each mold assembly 12 comprises a first member 13 which contains disposed therein a molding cavity of the desired panel configuration and a second member 14 which serves as a lid for the cavity of member 13. In the drawings, this molding cavity is shown filled with poured cement. Members 13 and 14 are braced by metallic beams 13a and 14a, respectively, which are affixed to the outer surfaces of members 13 and 14 and by metal beams 13b and 14b, respectively, which run perpendicular to beams 13a and 14a and are attached thereto. It is common practice to brace the walls of the molds in order to prevent their buckling under the heavy load of concrete which they must support. Conventional concrete vibrators 15 are affixed to the outer surface of bracing beam 14b. These vibrators assist in settling the concrete uniformly within the mold.

The top member 14 of the mold assembly 12 is rigidly affixed to frame 10 at its lower end by mounting 16. Member 14 is similarly rigidly affixed at its upper end to frame 10 by rigid strut 17. It is thus seen that member 14 of mold assembly 12 is maintained in a stationary position in the apparatus.

The lower member 13 of mold assembly 12, however, is pivotally attached to frame 10 by hinge 18, thereby permitting member 14 to rotate through an arc ranging from the horizontal position to an angle substantially identical to that at which upper member 14 is disposed. Member 13 is raised or lowered, as desired, by the action of cable 19, which is attached to bracing beam 13b of member 13 at 20. Cable 19 is actuated by electrically operated hoisting motor 21. Cable 19 passes over pulley 22 which is rigidly mounted on bracing beam 14b of member 14.

During pouring of the concrete, the mold assembly 12 is disposed at the position shown in FIG. 1. Referring to FIG. 1A, it is seen that the outer extremity of mold assembly 12 is provided with a cap 30 which is attached to member 13 by hinge 31. Before the concrete is poured, cap 30 is opened to expose the interior cavity of the mold assembly while simultaneously providing an aperture through which the concrete can be poured into the interior of the mold. Prior to pouring the concrete, any suitable means for reinforcing the concrete panel is inserted into the mold. Such means can include a network of criss-crossing metal rods, or sheets of open wire mesh. This reinforcing material can be positioned at the proper location within the mold by the use of chairs or other anchoring devices known to those skilled in the art. In the drawings, this reinforcement means is generally designated by the numeral 32. After the reinforcement means is emplaced within the mold, the conrete is poured, pumped or otherwise placed into the mold through the aperture created by the opening of cap 30. When the mold is filled with concrete, enough additional concrete is added to deposit a buildup of material on the opened cap 30. The cap is then closed by pivoting about hinge 31 to force this additional concrete material into the mold to produce a squared-off panel at that end of the mold.

Once the concrete has partially set, the lower mold member 13 can be lowered to the horizontal position, as shown in FIG. 2, and placed upon a trolley 40. Mold member 13 containing the concrete panel 41 can then be detached from frame 10 at hinge 18 for removal to a curing oven or any other application.

FIGS. 3 and 4 illustrate the use of the apparatus to prepare a concrete panel comprising a layer of insulating material sandwiched between two outer layers of concrete. In preparing such a panel, member 13 of mold assembly 12 is lowered to a horizontal position as shown in FIG. 3. A first layer of concrete 50 is then poured into the mold. A layer of insulating material 51 is then emplaced upon the surface of concrete layer 50 while layer 50 is still moist. Means 52 for connecting the two concrete layers across insulating layer 51 must be provided if the panel is to be of rigid construction. Such connecting members are well known and typically comprise a plurality of metal rods which pierce insulating layer 51 and extend on both sides of layer 51 into the adjacent concrete layers.

Once the insulating layer 51 has been emplaced in the mold, member 13 is elevated to its inclined position as shown in FIG. 4. At this point, a second layer of concrete 53 is then poured, pumped or otherwise placed into the mold in the area between member 14 and the surface of insulating layer 51. Once this second layer 53 of concrete is poured, the concrete is allowed to set after which member 14 is lowered to the horizontal position to facilitate easy removal of the precase sandwich panel from the mold.

Mold assembly 12 is typically disposed at an angle of from about 20° to about 70° above the horizontal and preferably 30° to 60° above the horizontal. When concrete is placed into the mold while disposed at such an angle, substantially no segregation of the aggregate occurs as a result of the frictional forces exerted by the surfaces of the mold as the concrete flows over them. Moreover, since the concrete is poured into a closed mold, both surfaces of the panel will have a smooth finish thereby eliminating the need for any further hand or machine finishing of either surface.

The angle at which the mold is disposed above the horizontal is the angle measured from the horizontal to an appropriate dimension of the mold. For example, if the mold is of a panel configuration, the angle would be measured from the horizontal to the plane of the panel. On the other hand, if the mold was of a cylindrical configuration, the angle would be measured from the horizontal to the axis of the cylinder. The important thing is that the angle of the mold be such as to substantially eliminate segregation of the aggregate particles as the concrete is poured into the mold.

A second preferred embodiment of the apparatus of this invention is depicted in FIGS. 5 through 8. Referring to these Figures, it is seen that this apparatus comprises a vertical frame 60 mounted on a rigid support member 61. Attached to this frame is a battery 62 of a plurality of individual mold assemblies 63 (see FIGS. 7 and 8) which are aligned in a series arrangement. Each mold assembly 63 comprises two separate mold members 63a and 63b which cooperate to define a molding cavity of the desired geometric configuration. Member 63a contains a molding cavity of a panel configuration while member 63b functions as a lid for the cavity when the two members are assembled. The molding cavity is provided with an aperture 64 for introducing moldable building material into the cavity by gravity flow, pumping or other suitable means. Members 63a and 63b are each braced by metal beams 65 which run in one direction and metal beams 66 which run in a direction substantially perpendicular to those of beams 65 (see FIGS. 7 and 8).

Figure 5:
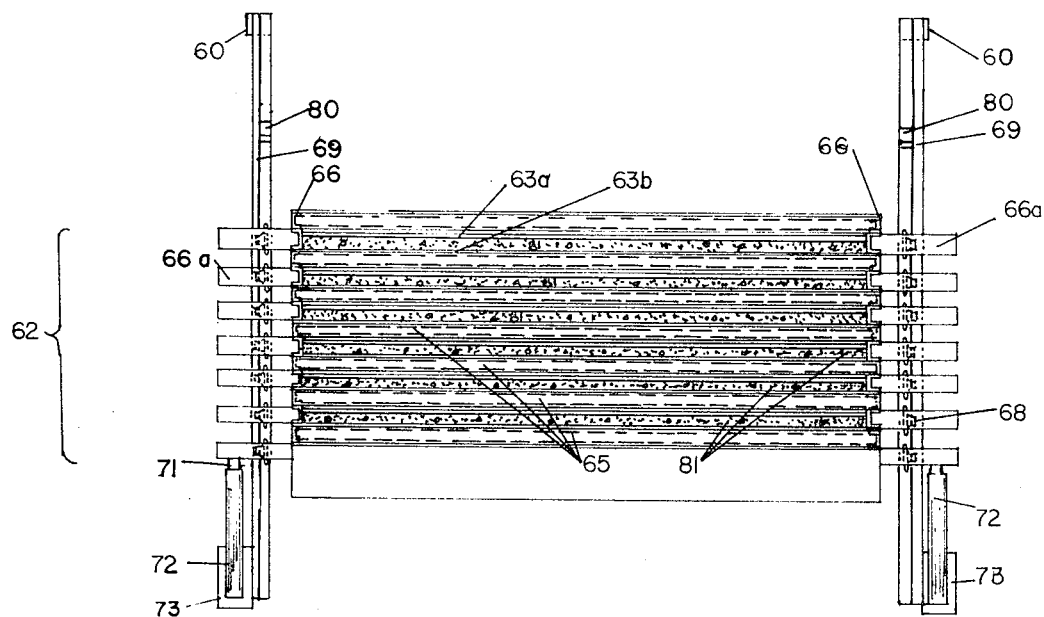
FIG. 5 is a plan view of another preferred embodiment of the apparatus of this invention, corresponding to the side view of FIG. 8.
Figure 6:
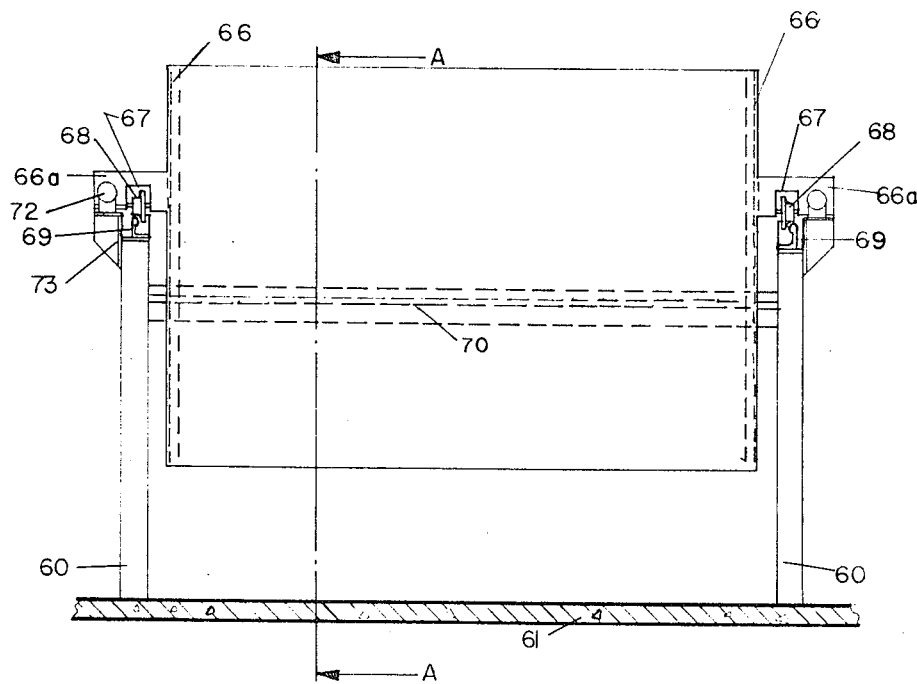
FIG. 6 is an end view of the apparatus of FIG. 5.

Each mold member 63a and 63b is pivotally and slidably mounted on track 69 as best seen in FIGS. 5 and 6. Referring to these Figures, it is seen that each bracing beam 66 of members 63a and 63b has affixed thereto a leg 66a extending away from beam 66 and toward frame 60. Each leg 66a contains a cut-out 67 (see FIG. 6) in which is rotatably mounted a wheel 68. Wheel 68 communicates with track members 69 which are mounted on frame 60 on opposed sides of the mold assemblies as best seen in FIG. 6. Since wheel 68 is rotatably mounted in cut-out 67, mold assemblies 63 are pivotally mounted on frame 60. Since wheels 68 engage track 69, which runs substantially the length between vertical frames 60 as shown, mold assemblies 63 are also slidably mounted on frame 60. The slidable mounting is an optional feature which facilitates unloading of the molds as discussed hereinbelow.

A rigid member 70 (see FIGS. 7 and 8) is mounted to frame 60 and is disposed to serve as a fulcrum about which all of the mold assemblies 63 comprising mold battery 62 can be pivoted. Mold assemblies 63 are pivoted about member 70 by the action of extending rods 71 against the flat surface of leg 66a. Shafts 71 are disposed on each side of mold battery 62 and are extended in response to the activation of hydraulic jacks 72 which are mounted on brackets 73 (see FIG. 6) attached to frame 60. The battery of mold assemblies 62 can be inclined to any desired angle for pouring of concrete into the molds. A stop 80 can be conveniently mounted on frame 60 to halt the pivoting of the mold assemblies at any angle desired for placement of the concrete into the molds. The mold assembly is disposed at an angle greater than 0° but less than 90° above the horizontal. Typically the mold is disposed at an angle of 20° to 70° and preferably 30° to 60°.

Figure 7:
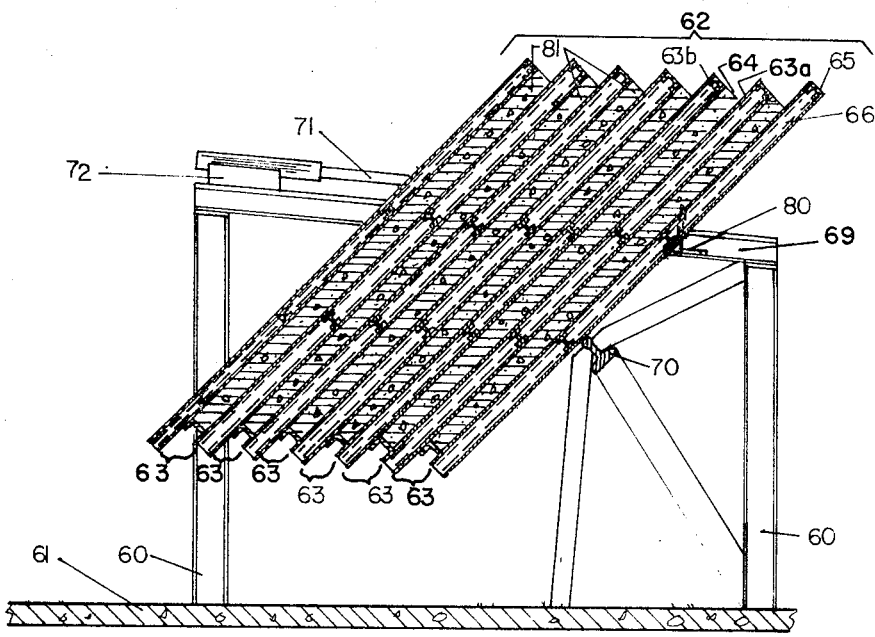
FIG. 7 is a side sectional view taken generally along the line A—A of FIG. 6, and shows the battery of mold assemblies disposed at an inclined angle in the apparatus.
Figure 8:
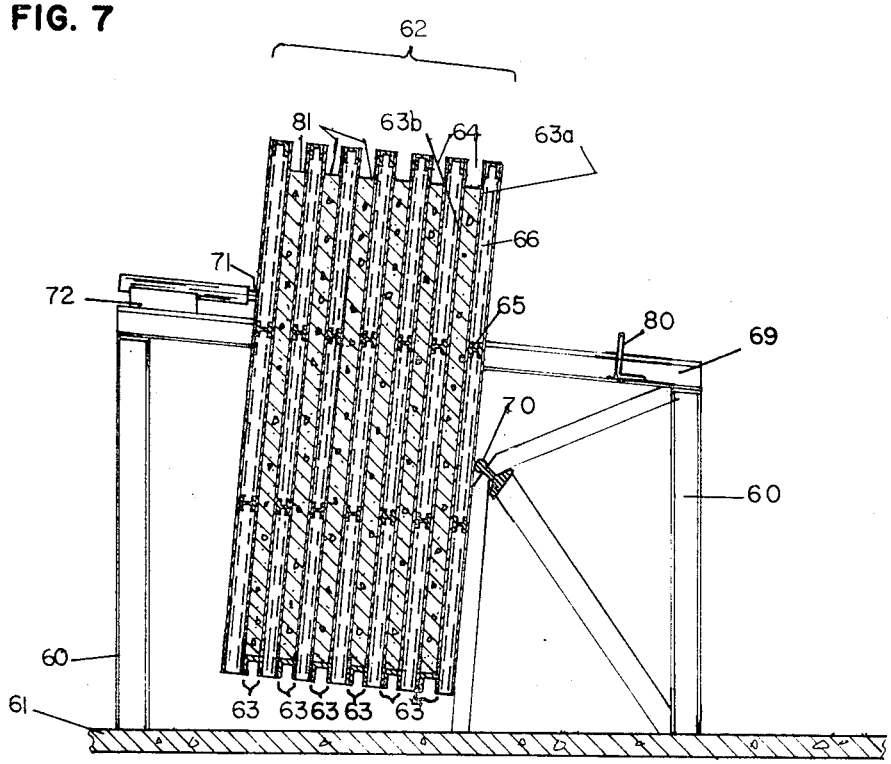
FIG. 8 is a view identical to FIG. 7 except that it shows the battery of mold assemblies disposed at a substantially upright angle in the apparatus.

FIG. 7 depicts the disposition of the battery of mold assemblies 63 during the placement of the concrete into the mold cavities. The battery of mold assemblies is retained in this position until the concrete has set. At this point, shafts 71 are retracted allowing the battery of mold assemblies to pivot under the influence of gravity into the substantially upright position shown in FIG. 8. At this point, the finished precast panels 81 can be removed either by vertically extracting them from the mold and thereby severing the bond between the panel and the surfaces of mold member 63a and 63b or, as is more convenient, the mold assembly can be horizontally disassembled making use of the slidability of members 63a and 63b along tracks 69. For example, lid member 63b could be slidably separated from member 63a to expose the precast panel contained in the cavity of member 63a. The panel is then readily accessible and can be quickly and conveniently removed from the mold. The same procedure can be followed for every mold assembly 63 contained within the battery 62 until the battery is completely disassembled. It is then a very convenient matter to simply reassemble the battery 62 for further fabrication of panels by sliding the mold assemblies back into the position shown in FIG. 8 and then tilting the battery to the inclined position shown in FIG. 7 for pouring the concrete.

The specific embodiments shown in the attached drawings and described hereinabove are illustrative only and such modifications and alterations as would be apparent to one skilled in the art are contemplated to fall within the spirit and scope of the claims appended hereto.

What is claimed is:

1. Apparatus for fabricating precast panels of a moldable material comprising:
    a. a frame;
    b. a plurality of mold assemblies aligned in series to form a battery of mold assemblies, each of said assemblies comprising (i) a first mold member containing a molding cavity therein of planar configuration, said cavity containing an aperture for introducing pourable moldable material into said cavity and (ii) a separate second mold member comprising a lid for said cavity, each of said mold members pivotally and slidably mounted on said frame;
    c. a fulcrum member; and
    d. means for pivoting said battery of mold assemblies about said fulcrum member.

2. The apparatus of claim 1 wherein the plane of said cavity is disposed at an angle of 30° to 60° above the horizontal.

3. The apparatus of claim 1 further including two track members mounted on said frame on opposed sides of said battery of mold assemblies, an extending leg communicating with opposed sides of each of said first and second mold members, said leg extending from said members towards said track members, a wheel rotatably mounted on each of said legs, said wheel adapted to cooperate with its adjacent track member to provide for the pivotal and slidable mounting of each of said mold members on said frame.

4. Apparatus for fabricating precast units of a moldable material comprising:
    a. a frame;
    b. a mold assembly having two separate mold members which cooperate to define a molding cavity of the desired geometric configuration, said mold assembly containing means for introducing pourable moldable material into said molding cavity, each of said separate mold members being pivotally and slidably mounted on said frame;
    c. a fulcrum member; and
    d. means for pivoting said mold assembly about said fulcrum member.

* * * * *